United States Patent
Bindl et al.

(10) Patent No.: US 11,014,454 B2
(45) Date of Patent: May 25, 2021

(54) ELECTRIC DRIVE SYSTEM WITH MULTIPLE SEPARATE ELECTRICAL BUSSES OPERATING AT DIFFERENT VOLTAGES

(71) Applicant: Deere & Company, Moline, IL (US)

(72) Inventors: Reginald M. Bindl, Dubuque, IA (US); Jacob Pence, Dubuque, IA (US); Mark J. Cherney, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 258 days.

(21) Appl. No.: 15/944,975

(22) Filed: Apr. 4, 2018

(65) Prior Publication Data
US 2019/0308511 A1    Oct. 10, 2019

(51) Int. Cl.
| | |
|---|---|
| H02H 7/22 | (2006.01) |
| B60L 15/00 | (2006.01) |
| B60L 7/14 | (2006.01) |
| B60L 1/00 | (2006.01) |
| B60K 6/26 | (2007.10) |
| B60K 6/36 | (2007.10) |

(Continued)

(52) U.S. Cl.
CPC .............. *B60L 15/007* (2013.01); *B60K 6/26* (2013.01); *B60K 6/36* (2013.01); *B60K 6/46* (2013.01); *B60L 1/003* (2013.01); *B60L 7/14* (2013.01); *B60L 50/14* (2019.02); *B60L 50/51* (2019.02); *B60L 50/61* (2019.02); *H02J 4/00* (2013.01); *B60L 2200/40* (2013.01); *B60L 2210/40* (2013.01); *B60L 2240/427* (2013.01); *Y10S 903/951* (2013.01)

(58) Field of Classification Search
CPC .... B60K 6/36; B60K 6/46; B60K 6/26; Y10S 903/951; B60L 50/51; B60L 2200/40; B60L 15/007; B60L 50/61; B60L 50/14; B60L 1/003; B60L 2210/40; B60L 2240/427; B60L 7/14; H02J 4/00
See application file for complete search history.

(56) References Cited

U.S. PATENT DOCUMENTS

| | | | |
|---|---|---|---|
| 8,008,876 B2 * | 8/2011 | Yonemori | B60L 50/61 318/151 |
| 9,327,609 B2 | 5/2016 | Ito et al. | |

(Continued)

*Primary Examiner* — Jared Fureman
*Assistant Examiner* — Esayas G Yeshaw
(74) *Attorney, Agent, or Firm* — Michael Best & Friedrich LLP

(57) ABSTRACT

An electric drive system for mechanical machinery. The electric drive system includes a first electrical bus and a second electrical bus each configured to operate at different voltages. A first generator is configured to provide electric current to the first electrical bus at a first voltage. A second generator is configured to provide electric current to the second electrical bus at a second voltage that is different from the first voltage. A first electric motor is coupled to the first electrical bus and configured to operate on electrical power from the first electrical bus at the first voltage. A second electric motor is coupled to the second electrical bus and configured to operate on electrical power from the second electrical bus at the second voltage. Mechanical power used to drive the mechanical machinery is generated by both the first electric motor and the second electric motor.

17 Claims, 5 Drawing Sheets

(51) Int. Cl.
*H02J 4/00* (2006.01)
*B60K 6/46* (2007.10)
*B60L 50/14* (2019.01)
*B60L 50/61* (2019.01)
*B60L 50/51* (2019.01)

(56) References Cited

U.S. PATENT DOCUMENTS

| | | |
|---|---|---|
| 2011/0048827 A1 | 3/2011 | Cherney et al. |
| 2011/0227408 A1 | 9/2011 | Peterson et al. |
| 2011/0278920 A1 | 11/2011 | Sakamoto et al. |
| 2013/0062938 A1 | 3/2013 | Kumar |
| 2013/0162182 A1* | 6/2013 | Nee .................. H02P 15/00 318/380 |
| 2013/0215543 A1* | 8/2013 | Hoeven .............. H02H 3/081 361/63 |
| 2014/0244082 A1* | 8/2014 | Caron ................. B60L 50/40 701/22 |
| 2015/0214864 A1 | 7/2015 | Sopko |
| 2016/0138463 A1* | 5/2016 | Kubes ................ F02B 33/34 60/607 |
| 2017/0170764 A1* | 6/2017 | Blackwelder ........... H02P 6/20 |
| 2017/0225671 A1* | 8/2017 | Ukegawa ............. B60L 50/51 |
| 2019/0225506 A1* | 7/2019 | Peng .................. C02F 1/14 |

\* cited by examiner

ELECTRIC DRIVE SYSTEM WITH MULTIPLE SEPARATE ELECTRICAL BUSSES OPERATING AT DIFFERENT VOLTAGES

BACKGROUND

The present invention relates to electric drive systems that utilize a generator to provide electrical power to an electric motor. In particular, the present invention relates to electric drive systems for machinery such as, for example, vehicles and wheel loaders.

SUMMARY

In one embodiment, the invention provides an electric drive system for mechanical machinery. The electric drive system includes a first electrical bus and a second electrical bus. A first generator is configured to provide electric current to the first electrical bus at a first voltage. A second generator is configured to provide electric current to the second electrical bus at a second voltage that is different from the first voltage. A first electric motor is coupled to the first electrical bus and configured to operate on electrical power from the first electrical bus at the first voltage. A second electric motor is coupled to the second electrical bus and configured to operate on electrical power from the second electrical bus at the second voltage. Mechanical power used to drive the mechanical machinery is generated by both the first electric motor and the second electric motor.

In some embodiments, the electric drive system further includes a transmission that is operatively coupled to both the first electric motor and the second electric motor and that generates a mechanical power output to the mechanical machinery by combining the mechanical power generated by both the first electric motor and the second electric motor. In some embodiments, the mechanical machinery includes a drive system for providing motive power for movement of a vehicle. In some implementations, the first electrical bus is an AC electrical bus and the second electrical bus is a DC electrical bus.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
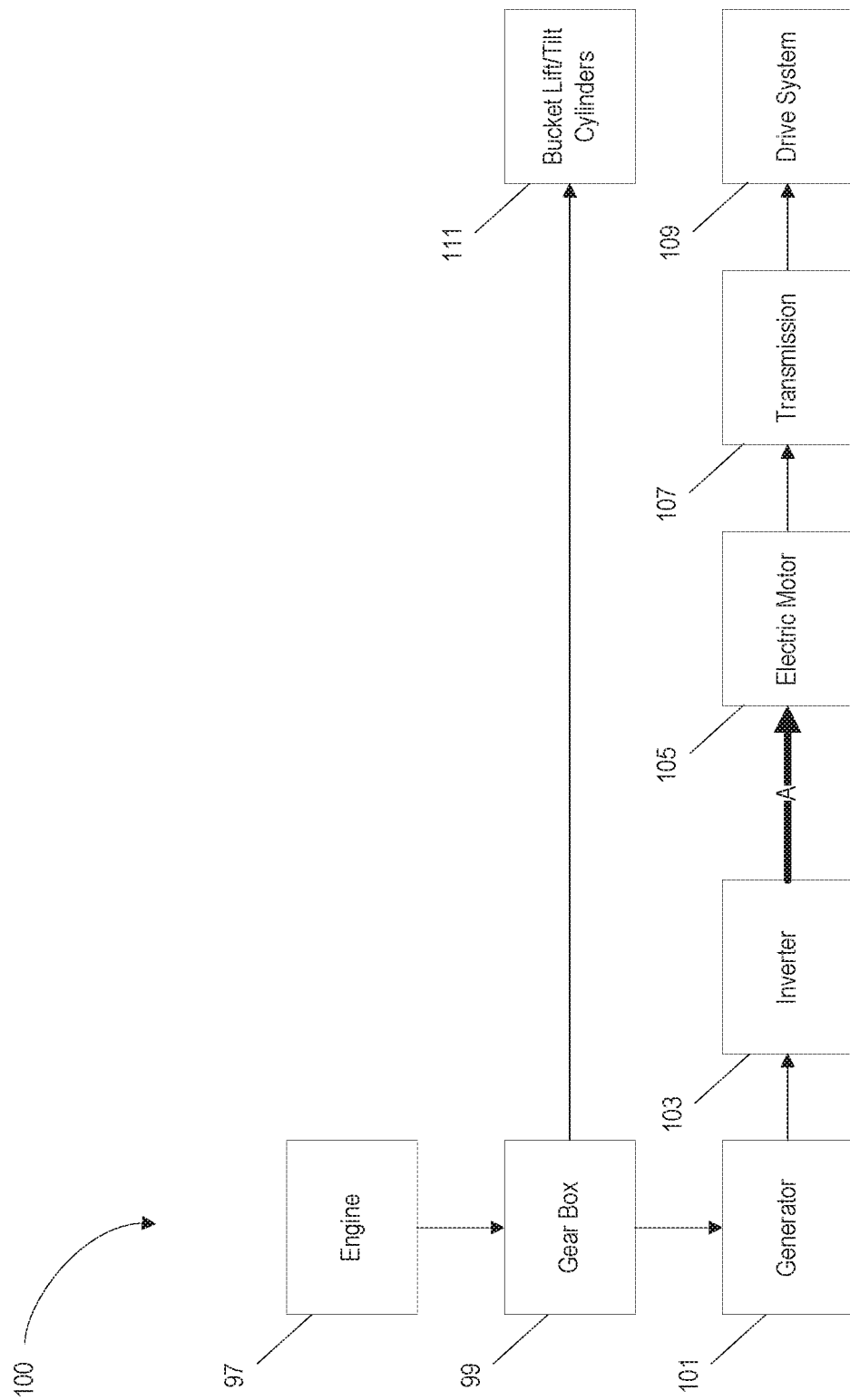
FIG. 1 is a schematic block diagram of a series electric drivetrain for a wheel loader according to one embodiment.

FIG. 1 illustrates an example of a series electric drivetrain 100 for a construction vehicle, such as, for example, a wheel loader. In this example, an engine 97 (e.g., a combustion engine powered by gasoline, diesel, propane, etc.) is coupled to a generator 101 through a gear box 99. The generator 101 generates and provides DC (direct current) electrical power to an inverter 103. The inverter 103 converts the DC electrical power from the generator into AC electrical power of a particular voltage and outputs the AC electrical power to an electrical bus "A" for use. An electric motor 105 is also coupled to the electrical bus "A" and draws electrical power from the electrical bus "A" to power the operation of the electric motor 105. The mechanical power generated by the electric motor 105 is applied to a transmission 107 that is mechanically coupled to the electric motor 105. Mechanical power from the transmission 107 is then used to operate other mechanical systems of the construction vehicle including, for example, providing the motive power to drive the wheels or tracks of the vehicle via the drive system 109. In this example, the gear box 99 is also operatively coupled to the hydraulic cylinder system 111 configured to controllably lift and tilt the bucket of the wheel loader. Accordingly, in this example, mechanical power from the engine 97 is utilized to operate the bucket cylinders 111.

In some other implementations, the generator 101 is provided as an electric machine without commutators, which produces an AC output. The inverter 103 in such implementations is configured as a rectifier to rectify the AC output of the generator. In various implementations, the AC output of the generator 101 might be rectified by a passive or active rectifier. Active rectifiers are commonly referred to as "inverters." Accordingly, in the example illustrated in FIG. 1 and in the other examples below, the phrase "inverter" is used to refer to either (a) an inverter that converts a DC output from a generator into an AC output or (b) an active rectifier that rectifies an AC output of a generator. Furthermore, to the extent that the examples described herein refer specifically to a generator that provides a DC output to an inverter, it is to be understood that the specific configurations and schematic examples described herein could be extended to alternative implementations that include a generator that produces an AC output that is provided to an active rectifier (e.g., an "inverter") for rectification.

Inverters and eMachines—such as, for example, generators and motors—are rated by power levels and by voltage. For inverters in particular, the cost difference between different "rating" levels of inverters can be significant. For example an inverter that is rated for a first power level may cost nearly twice as much as another inverter that is rated for a lower power level. Furthermore, the power ratings for available inverters are often tiered such that the next available inverter with a higher power rating may be rated for twice the amount of electrical power. Therefore, when a system requires an intermediate power level (i.e., a power level between the ratings of two available inverters), the system is often manufactured to include an inverter that is rated for a significantly higher power level than necessary. For example, if the system of FIG. 1 requires 30 kW of electrical power in order to operate the drive system 109 and the available inverters are rated for 25 kW and 50 kW, the manufacturer might implement the system to utilize an inverter with the next highest power rating (e.g., 50 kW) to ensure proper operation at the 30 kW load. In turn, the system might also need to be designed to utilize a generator 101 and/or an electric motor 105 that are also both rated for 50 kW of electrical power.

Figure 2:
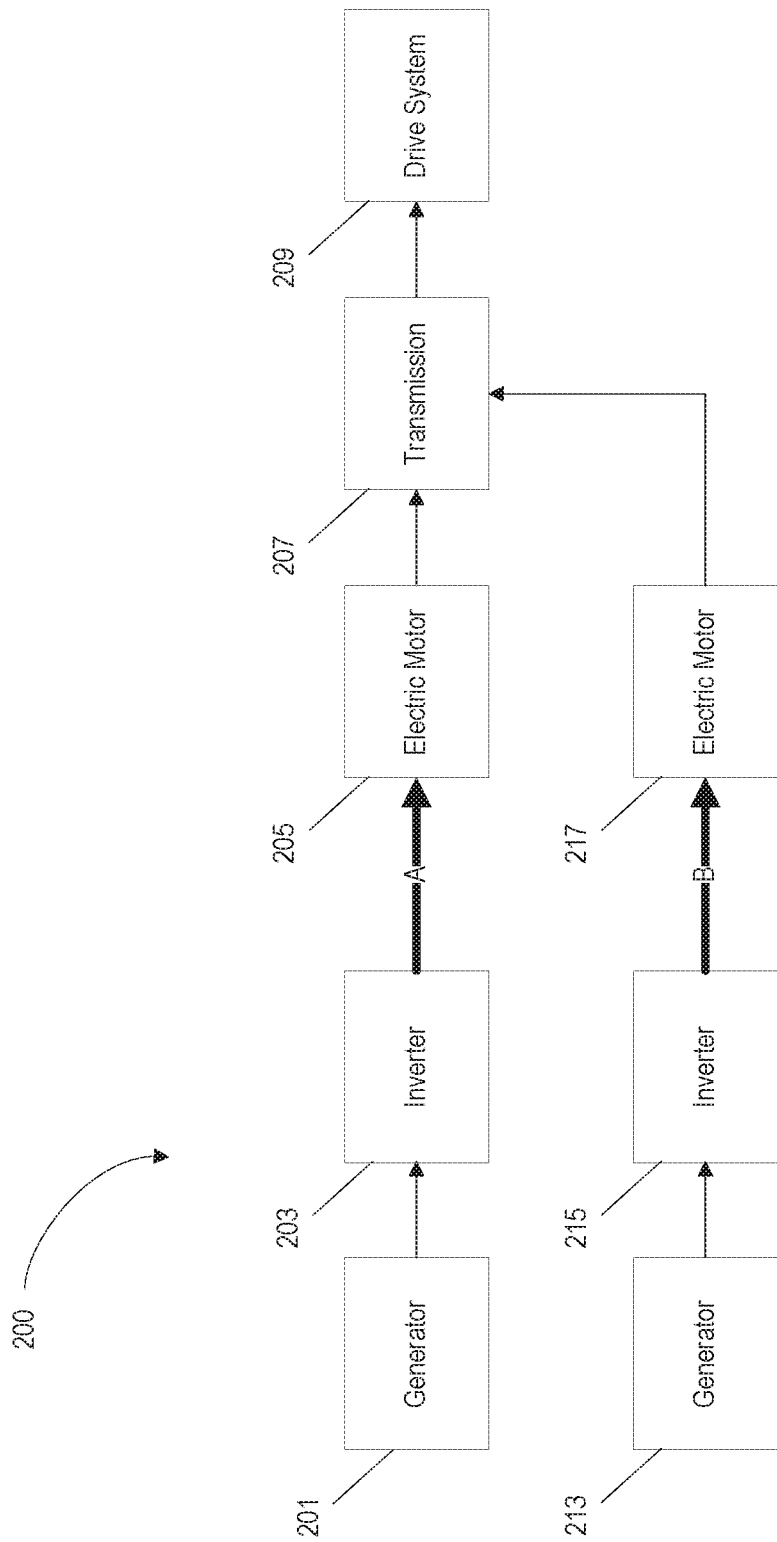
FIG. 2 is a schematic block diagram of an electric drivetrain for a vehicle (e.g., a wheel loader) with two generators each providing power to a different electrical bus at different voltages according to another embodiment.

FIG. 2 illustrates an alternative example of a drivetrain 200 for a construction vehicle, such as, for example, a wheel loader, which is configured to include two different series electric drivetrains operating in parallel. A first generator 201 again generates and provides DC electrical power to an inverter 203, which converts the DC electrical power into AC electrical power of a particular voltage and outputs the AC electrical power to a first electrical bus "A" for use. A second generator 213 also generates and provides DC electrical power to a second inverter 215, which similarly converts the DC electrical power into AC electrical power of a particular voltage and outputs the AC electrical power to a second electrical bus "B" for use. A first electric motor 205 is coupled to the first electrical bus "A" and configured to operate on electrical power drawn from the first electrical bus "A". A second electric motor 217 is coupled to the second electrical bus "B" and configured to operate on electrical power drawn from the second electrical bus "B".

In the system of FIG. 2, the inverters 203, 215 and the generators 201, 203 can be selected to have different electrical power ratings and to generate electrical power at different voltages. For example, the first generator 201 and the first inverter 203 might both be rated for a first electrical power level (e.g., X kW) and configured to output electrical power at first voltage (e.g., Y volts DC) on the first electrical bus "A" while the second generator 213 and the second inverter 215 might both be rated for a second, lower electrical power level (e.g., X/5 kW) and configured to output electrical power at second voltage (e.g., Y/2 volts) on the second electrical bus "B". Accordingly, the first electric motor 205 and the second electric motor 217 can also be selected with different power and/or voltage ratings to correspond to the respective inverter 203, 215.

In the example of FIG. 2, both the first electric motor 205 and the second electric motor 217 are coupled to the same transmission 207 and configured to both provide output mechanical power to the transmission 207. The combined mechanical power of the first electric motor 205 and the second electric motor 217 is then used to operate other mechanical systems of the construction vehicle including, for example, providing the motive power to drive the wheels or tracks of the vehicle via the drive system 209. Returning to the example above, if 30 kW of electrical power is required to operate the drive system 209, the system of FIG. 2 may be configured to utilize a first inverter 203 rated for 25 kW and a second inverter 215 rated for 5 kW instead of utilizing a single series electric drivetrain with an inverter rated for the next highest electrical power level (e.g., 50 kW).

Although the example of FIG. 2 includes only two combinations of generator/inverter/motor, in other implementations, the system may be configured to include additional generator/inverter combinations to provide electrical power (e.g., at different voltage levels) on other electrical busses. Similarly, some such implementations may also include additional electric motors coupled to the additional electrical busses.

Furthermore, although the example of FIG. 2 shows both electric motor 205 and electric motor 217 providing mechanical power to the same transmission, in other implementations, the system may be configured to use the output of the different electric motors to operate different mechanical systems. For example, the system may be configured to use the output of the first electric motor 205 to operate the drive system 209 and to use the output of the second electric motor 217 to operate the bucket lift/tilt cylinders. Similarly, in other implementations, the system may be configured to use the output of the first electric motor 205 to provide motive power to the rear wheels of the vehicle and to use the output of the second electric motor 217 to provide motive power to the front wheels of the vehicle. Accordingly, other implementations may be configured to include two or more transmission systems instead of a single transmission 207 as illustrated in the example of FIG. 2.

Figure 3:
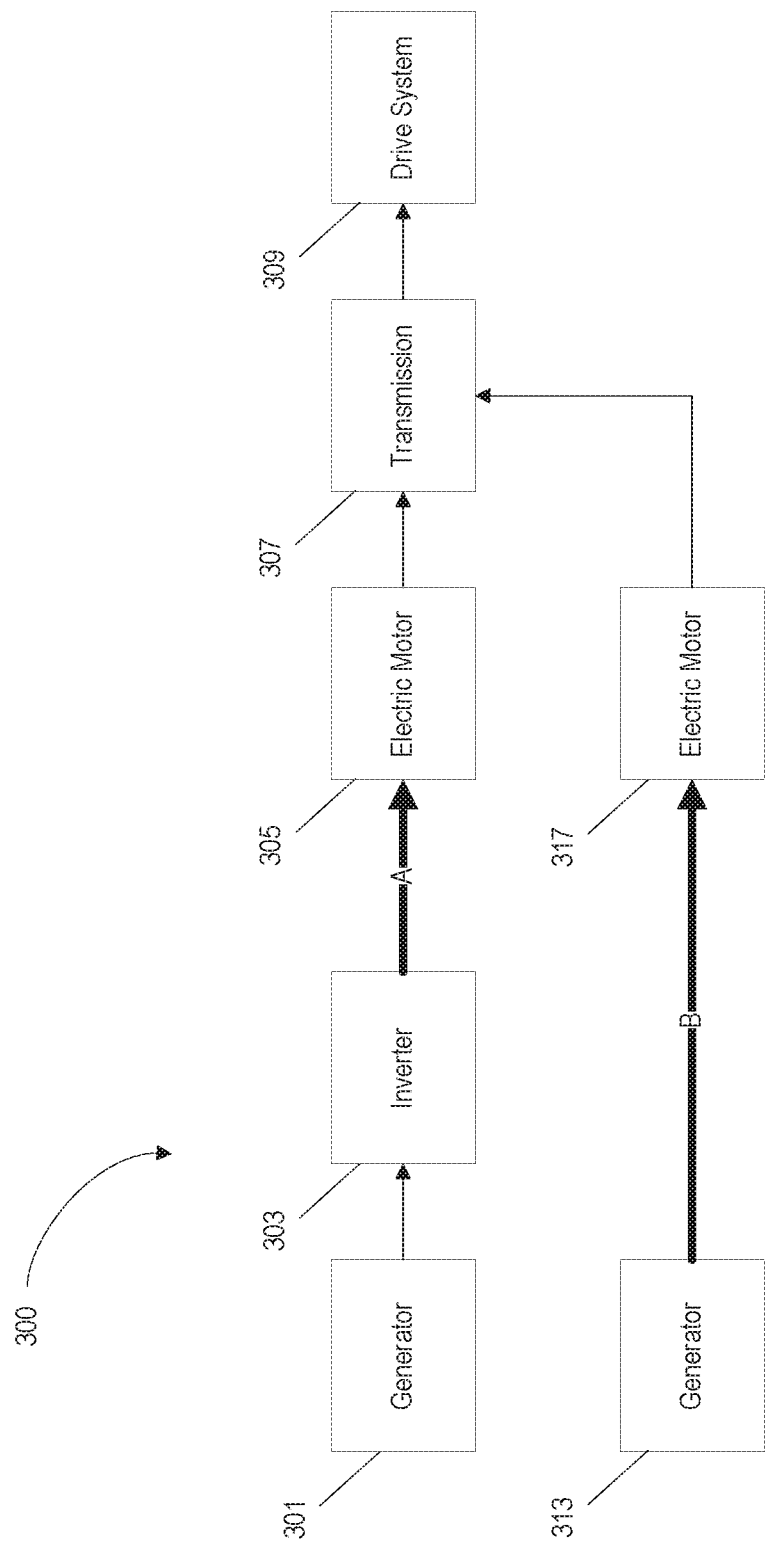
FIG. 3 is a schematic block diagram of the electric drivetrain of FIG. 2 configured to include an inverter on only one of the two electrical busses.

The system 200 illustrated in FIG. 2 is only one example of implementations configured to utilize multiple electrical buses at different voltages. Other implementations may include additional, fewer, or different components and may be implemented in different machinery and/or to provide mechanical power to different output devices. For example, FIG. 3 illustrates and example of a drivetrain system 300 that includes two different electrical busses, but does not include a second inverter. Like the system of FIG. 2, the drivetrain system 300 of FIG. 3 includes a first generator 301 that generates and provides DC electrical power to an inverter 303, which converts the DC electrical power into AC electrical power of a particular voltage and outputs the AC electrical power to a first electrical bus "A" for use. A first electric motor 305 is coupled to and draws its operating power from the first electrical bus "A."

The system 300 also includes a second generator 313. However, in the example of FIG. 3, the second generator 313 provides output electrical power directly to the second electrical bus "B" without first using an inverter to convert the electrical power output from the second generator 313. In some implementations, the second generator 313 includes an electric machine with integrated electronics. A second electric motor 317 is also coupled to and draws its operating power from the second electrical bus "B." In some implementations, the generator 313 may be configured to generate AC electrical power instead of DC electrical power and, as such, an inverter might not be necessary in order to provide AC electrical power to the second electrical bus "B". However, in other implementations, the system may be configured to include both an AC electrical bus (i.e., the first electrical bus "A") and a DC electrical bus (i.e., the second electrical bus "B"). In such implementations, the second generator 313 is configured to generate DC electrical power and to output the DC electrical power directly to the second electrical bus "B" for use. In some such implementations, the second electric motor 317 coupled to the DC electrical bus (i.e., the second electrical bus "B") may be configured to operate on DC electrical power. Alternatively, an inverter may be incorporated into the second electric motor 317 or an additional inverter may be configured on the output side of the second electrical bus "B" to convert DC power drawn from the second electrical bus "B" into AC power, which is then used to operate the electric motor 317. In the example of FIG. 3, the first electric motor 305 and the second electric motor 317 are again both mechanically coupled to provide mechanical power to a transmission 307, which is in turn used to operate the drive system 309.

In the examples of FIGS. 2 and 3, the generators 201, 213 or 301, 313 can be coupled to the same engine (e.g., a combustion engine fueled by gasoline, diesel, or propane) through one or more gear boxes. Alternatively, in some implementations, the construction vehicle (e.g., the wheel loader) can be configured to include two separate engines each coupled to a different one of the two generators.

Furthermore, as discussed above in reference to FIG. 1, in some implementations, the hydraulic cylinder system used to controllably lift and tilt the bucket of the wheel loader is operatively coupled through a gear box to the same engine that powers the generator. Similarly, in some implementations of the examples of FIGS. 2 and 3, a single engine may be operatively coupled by one or more gear boxes to the first generator 201/301, the second generator 213/313, and to additional mechanical devices or systems such as, for example, the hydraulic cylinder system used to controllably lift and tilt the bucket of the wheel loader.

Figure 4:
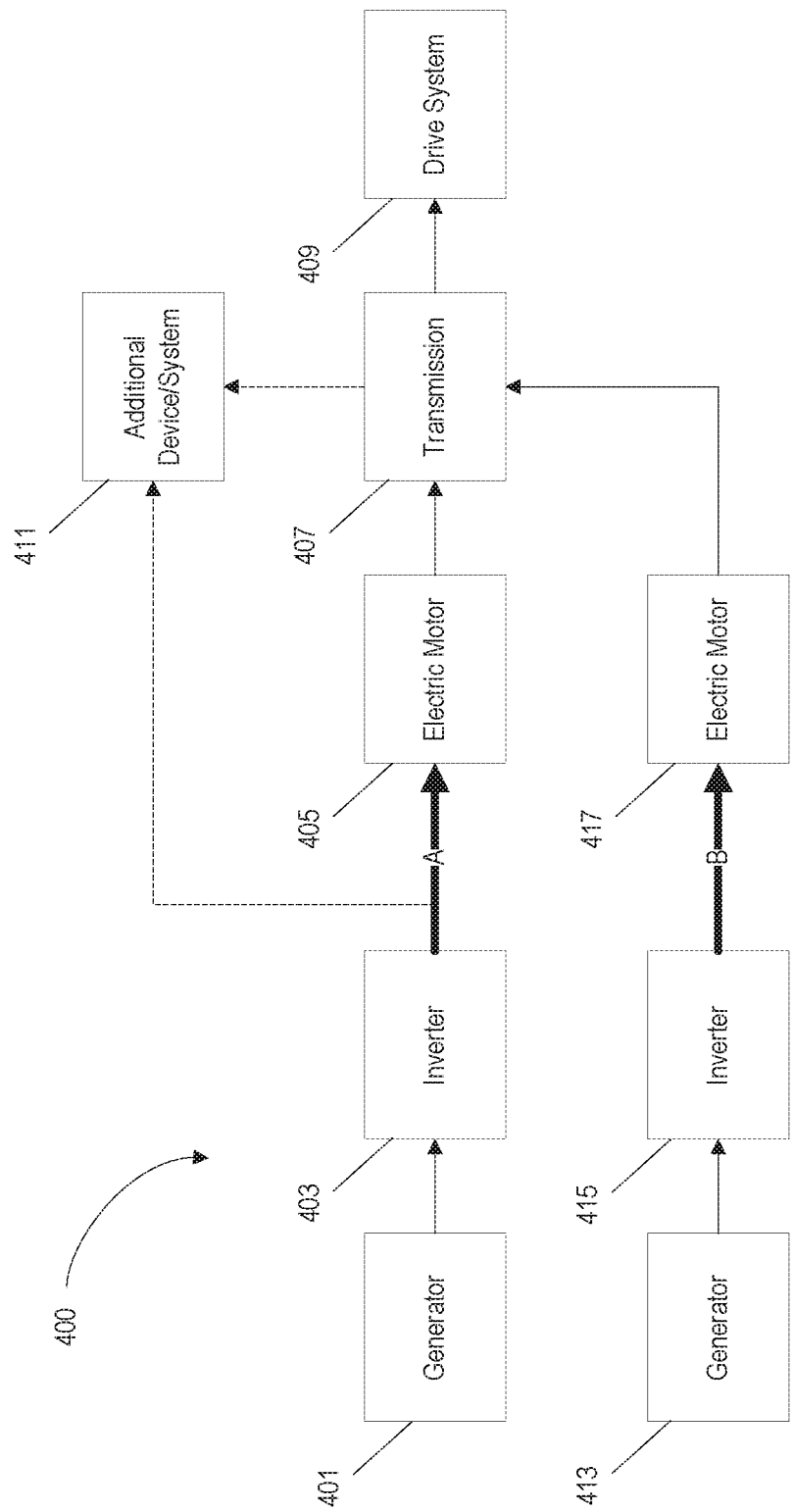
FIG. 4 is a schematic block diagram of the electric drivetrain of FIG. 2 configured for use in a vehicle with an additional electrically-powered or mechanically-powered device or system.

Additionally, in some implementations, the system may be further configured to provide mechanical operating power or electrical operating power to other devices or systems through the electrical powertrain system. FIG. 4 illustrates one such example where the system is configured to provide operating power to other systems and/or devices in addition to the drive system of the vehicle. The system 400 includes a first generator 401 that generates and provides DC electrical power to a first inverter 403, which converts the DC electrical power into AC electrical power of a particular voltage and outputs the AC electrical power to a first electrical bus "A" for use. A first electric motor 405 is coupled to and draws its operating power from the first electrical bus "A." Similarly, a second generator 413 generates and provides DC electrical power to a second invertor 415, which converts the DC electrical power into AC electrical power of a second particular voltage and outputs the AC electrical power to a second electrical bus "B" for use. A second electric motor 417 is coupled to and draws its operating power from the second electrical bus "B." The first electric motor 405 and the second electric motor 417 are both mechanically coupled to provide mechanical power to a transmission 407, which then uses the combined mechanical output power from both the first electric motor 405 and the second electric motor 417 to operate the drive system 409 of the vehicle.

In the example of FIG. 4, one or more additional device or system can also be operatively coupled to receive operating power from the drivetrain system. In some implementations, the additional device/system 411 may include a mechanically-powered device or system that is operatively coupled to an output of the transmission 407 so that the combined mechanical output power of the first electric motor 405 and the second electric motor 417 is used to operate both the drive system 409 and the additional mechanically-powered device/system 411. For example, in some implementations, the hydraulic cylinder system used to controllably lift and tilt the bucket of the wheel loader is implemented as the additional mechanically-powered device/system 411 and is configured to draw mechanical operating power from the transmission 407.

In some implementations, the additional device/system 411 may include an electrically-powered device or system that is electrically coupled to the electrical bus "A" and configured to draw electrical power from the same electrical bus as the first electric motor 405. For example, in some implementations, the hydraulic cylinder system used to controllably lift and tilt the bucket of the wheel loader may be implemented as a system with an electrically-powered hydraulic pump and/or valves that is configured to draw electrical operating power from the electrical bus "A." Similarly, in some implementations, the additional device/system 411 may include one or more electrical vehicle lights coupled to the electrical bus "A" and configured to draw their operating power from the electrical bus "A." In still other implementations, the transmission 407 may be implemented, for example, as a split-path transmission that is configured to utilize electrical power to controllably operate a variator and, in turn, adjust the speed of the mechanical output power of the transmission. In such implementations, the system of FIG. 4 may be configured such that the additional electrically-powered device/system 411 includes the electrically-controlled variator of the split-path transmission that is configured to operating on electrical power drawn from the electrical bus "A".

Figure 5:
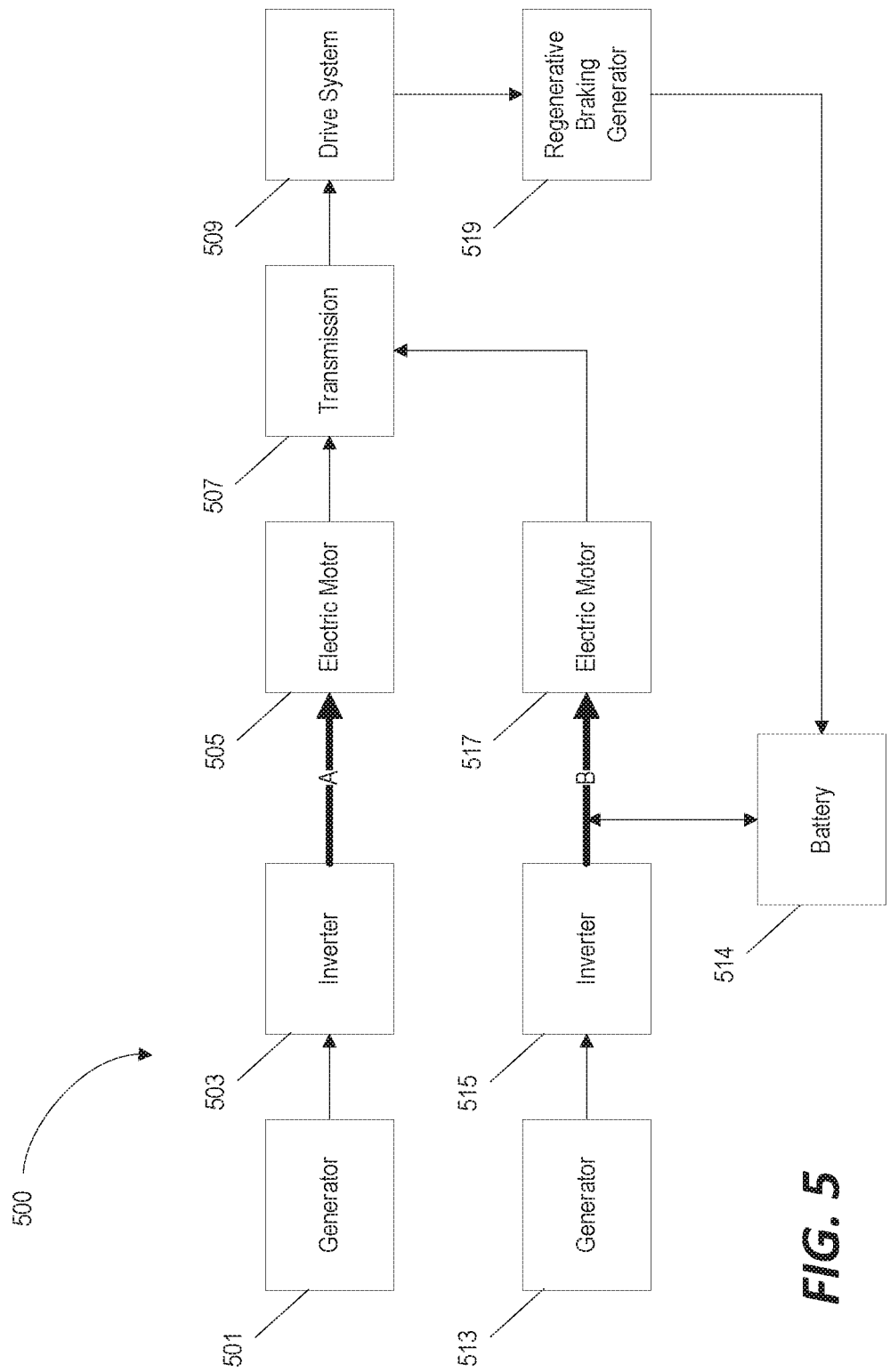
FIG. 5 is a schematic block diagram of the electric drive train of FIG. 2 configured to include a regenerative braking system.

In the examples above, the electrical power provided to each individual electrical bus originates from a single generator. As noted above, in some implementations, the generator is powered by or includes a combustion engine fueled, for example, by gasoline, diesel, or propane. However, in other implementations, the generator can be implemented as another type of generator including, for example, a solar power generator or a wind power generator. In still other implementations, electrical power on an individual electrical bus can be received from multiple different generator sources. FIG. 5 illustrates an example in which electrical power on one of the two electrical busses is received both from a generator (e.g., a gasoline-powered generator) and from a regenerative braking generator.

The system 500 of FIG. 5 includes a first generator 501 that generates and provides DC electrical power to a first inverter 503, which converts the DC electrical power into AC electrical power of a first particular voltage and outputs the AC electrical power to a first electrical bus "A" for use. A first electric motor 505 is coupled to and draws its operating power from the first electrical bus "A." A second generator 513 generates and provides DC electrical power to a second inverter 515, which converts the DC electrical power into AC electrical power of a second particular voltage and outputs the AC electrical power to a second electrical bus "B" for use. A second electric motor 517 is coupled to and draws its operating power from the second electrical bus "B." The first electric motor 505 and the second electric motor 517 are both mechanically coupled to provide mechanical power to a transmission 507, which then uses the combined mechanical output power from both the first electric motor 505 and the second electric motor 517 to operate a drive system 509 of the vehicle and one or more bucket lift/tilt cylinders (e.g., of a wheel loader).

The system 500 is also configured to include a regenerative braking generator 519 that is configured to slow the movement of the vehicle by converting the kinetic energy of the vehicle (e.g., on the wheels, axle, etc.) into electrical energy. The regenerative braking generator 519 is configured to provide generated electrical power to charge a battery 514. The stored electrical power on the battery 514 is then provided either directly to the second electrical bus "B" or, in some cases, to the inverter 515 (or another additional inverter) to convert/condition the output of the battery (e.g., to convert to AC) before the electrical power from the battery is provided to the second electrical bus "B" for use.

Although, in the example of FIG. 5, electrical power from the regenerative braking generator 519 is provided only to the second electrical bus "B," in other implementations, the system may be configured to provide electrical power from regenerative braking to both electrical busses. For example, the battery 514 may be coupled to two separate inverters—one of which is configured to condition/convert the output electrical power from the battery 514 into electrical power appropriate for the first electrical bus "A" while the other inverter is configured to condition/convert the output from the battery 514 into a form that is appropriate for the second electrical bus "B." Each inverter would then be coupled to provide its conditions electrical output to a respective one of the first electrical bus "A" and the second electrical bus "B." In other implementations, the system 500 may be configured to include separate batteries for the first electrical bus "A" and for the second electrical bus "B" and may also be configured to include separate regenerative braking generators to provide power to each different battery.

Furthermore, in some implementations, the electric drive systems illustrated in FIGS. 1, 2, 3, 4, and/5 may be further configured to include one or more batteries to store electric energy from the generator and to provide the stored energy to the electrical bus (e.g., via the inverter) in order to maintain a constant voltage, current, and/or power level on the electrical bus.

Thus, the invention provides, among other things, an electric drive system configured to utilize at least two separate electrical busses operating at different voltages. Various features and advantages of the invention are set forth in the following claims.

What is claimed is:

1. An electric drive system for mechanical machinery, the electric drive system comprising:
   a first electrical bus;
   a first generator configured to provide electric current to the first electrical bus at a first voltage;
   a second electrical bus;
   a second generator configured to provided electric current to the second electrical bus at a second voltage, the second voltage being different from the first voltage;
   a first electric motor coupled to the first electrical bus and configured to operate on electrical power from the first electrical bus at the first voltage, wherein the first electric motor generates mechanical power for the mechanical machinery;
   a second electric motor coupled to the second electrical bus and configured to operate on electrical power from the second electrical bus at the second voltage, wherein the second electric motor generates mechanical power for the mechanical machinery; and
   a first inverter operatively coupled between the first generator and the first electrical bus,
   wherein the first generator is configured to provide the electric current to the first electrical bus at the first voltage by providing an electrical output to the first inverter which is converted by the first inverter to an AC output at the first voltage that is provided by the first inverter to the first electrical bus.

2. The electric drive system of claim 1, further comprising a second inverter operatively coupled between the second generator and the second electrical bus,
   wherein the second generator is configured to provide the electric current to the second electrical bus at the second voltage by providing an electrical output to the second inverter which is converted by the second inverter to an AC output at the second voltage that is provided by the second inverter to the second electrical bus.

3. The electric drive system of claim 2, wherein the first inverter is rated for a first electrical power level and the second inverter is rated for a second electrical power level, wherein the second electrical power level is less than the first electrical power level.

4. The electric drive system of claim 3, wherein the first electric motor and the first generator are both configured to operate at a power level corresponding to the first electrical power level rating of the first inverter, and wherein the second electric motor and the second generator are both configured to operate at a power level corresponding to the second electrical power level rating of the second inverter.

5. The electric drive system of claim 1, wherein the first electrical bus is an AC electrical bus, wherein the second electrical bus is a DC electrical bus, and wherein the second generator is a DC generator and is configured to provide the electric current to the second electrical bus at the second voltage by providing a DC output to the second electrical bus.

6. The electric drive system of claim 1, further comprising an electrically-powered device, wherein the electrically-powered device is coupled to the first electrical bus and configured to draw operating electrical power from the first electrical bus at the first voltage.

7. The electric drive system of claim 1, wherein the first electrical bus is coupled to an additional electrical power source configured to provide electrical current to the first electrical bus.

8. The electric drive system of claim 7, wherein the mechanical machinery includes a drive system configured to provide a motive force for movement of a vehicle, wherein the additional electrical power source includes a regenerative braking generator operatively coupled to the drive system and configured to generate an electric output while slowing movement of the vehicle, and wherein the regenerative braking generator is configured to provide electric current from the electric output to the first electrical bus.

9. The electric drive system of claim 8, further comprising a battery configured to store electrical energy from at least one selected from a group consisting of the regenerative braking generator and the first generator, and wherein the battery is configured to provide the stored electrical energy to the first electrical bus.

10. An electric drive system for mechanical machinery, the electric drive system comprising:
    a first electrical bus;
    a first generator configured to provide electric current to the first electrical bus at a first voltage;
    a second electrical bus;
    a second generator configured to provided electric current to the second electrical bus at a second voltage, the second voltage being different from the first voltage;
    a first electric motor coupled to the first electrical bus and configured to operate on electrical power from the first electrical bus at the first voltage, wherein the first electric motor generates mechanical power for the mechanical machinery;
    a second electric motor coupled to the second electrical bus and configured to operate on electrical power from the second electrical bus at the second voltage, wherein the second electric motor generates mechanical power for the mechanical machinery; and
    a transmission operatively coupled to both the first electric motor and the second electric motor, and wherein the transmission is configured to combine mechanical power from both the first electric motor and the second electric motor to provide a mechanical power output to operate the mechanical machinery.

11. The electric drive system of claim 10, wherein the mechanical machinery includes a drive system for a vehicle, and wherein the mechanical power output from the transmission provides motive power for movement of the vehicle to the drive system.

12. The electric drive system of claim 11, wherein the mechanical machinery further includes a second mechanically-powered device, and wherein the mechanical power output from the transmission operates the second mechanically-powered device.

13. An electric drive system for mechanical machinery, the electric drive system comprising:
    a first electrical bus;
    a first generator configured to provide electric current to the first electrical bus at a first voltage;
    a second electrical bus;
    a second generator configured to provided electric current to the second electrical bus at a second voltage, the second voltage being different from the first voltage;
    a first electric motor coupled to the first electrical bus and configured to operate on electrical power from the first electrical bus at the first voltage, wherein the first electric motor generates mechanical power for the mechanical machinery; and
    a second electric motor coupled to the second electrical bus and configured to operate on electrical power from the second electrical bus at the second voltage, wherein the second electric motor generates mechanical power for the mechanical machinery,
    wherein the first generator and the first motor are configured to operate at a first electrical power level, wherein the second generator and the second motor are configured to operate at a second electrical power level, wherein the second electrical power level is less than the first electrical power level, and wherein the second voltage is less than the first voltage.

14. The electric drive system of claim 13, further comprising an electrically-powered device, wherein the electrically-powered device is coupled to the first electrical bus and configured to draw operating electrical power from the first electrical bus at the first voltage.

15. The electric drive system of claim 13, wherein the first electrical bus is coupled to an additional electrical power source configured to provide electrical current to the first electrical bus.

16. The electric drive system of claim 15, wherein the mechanical machinery includes a drive system configured to provide a motive force for movement of a vehicle, wherein the additional electrical power source includes a regenerative braking generator operatively coupled to the drive system and configured to generate an electric output while slowing movement of the vehicle, and wherein the regenerative braking generator is configured to provide electric current from the electric output to the first electrical bus.

17. The electric drive system of claim 16, further comprising a battery configured to store electrical energy from at least one selected from a group consisting of the regenerative braking generator and the first generator, and wherein the battery is configured to provide the stored electrical enemy to the first electrical bus.

* * * * *